ically limited applicability to human body waste only.

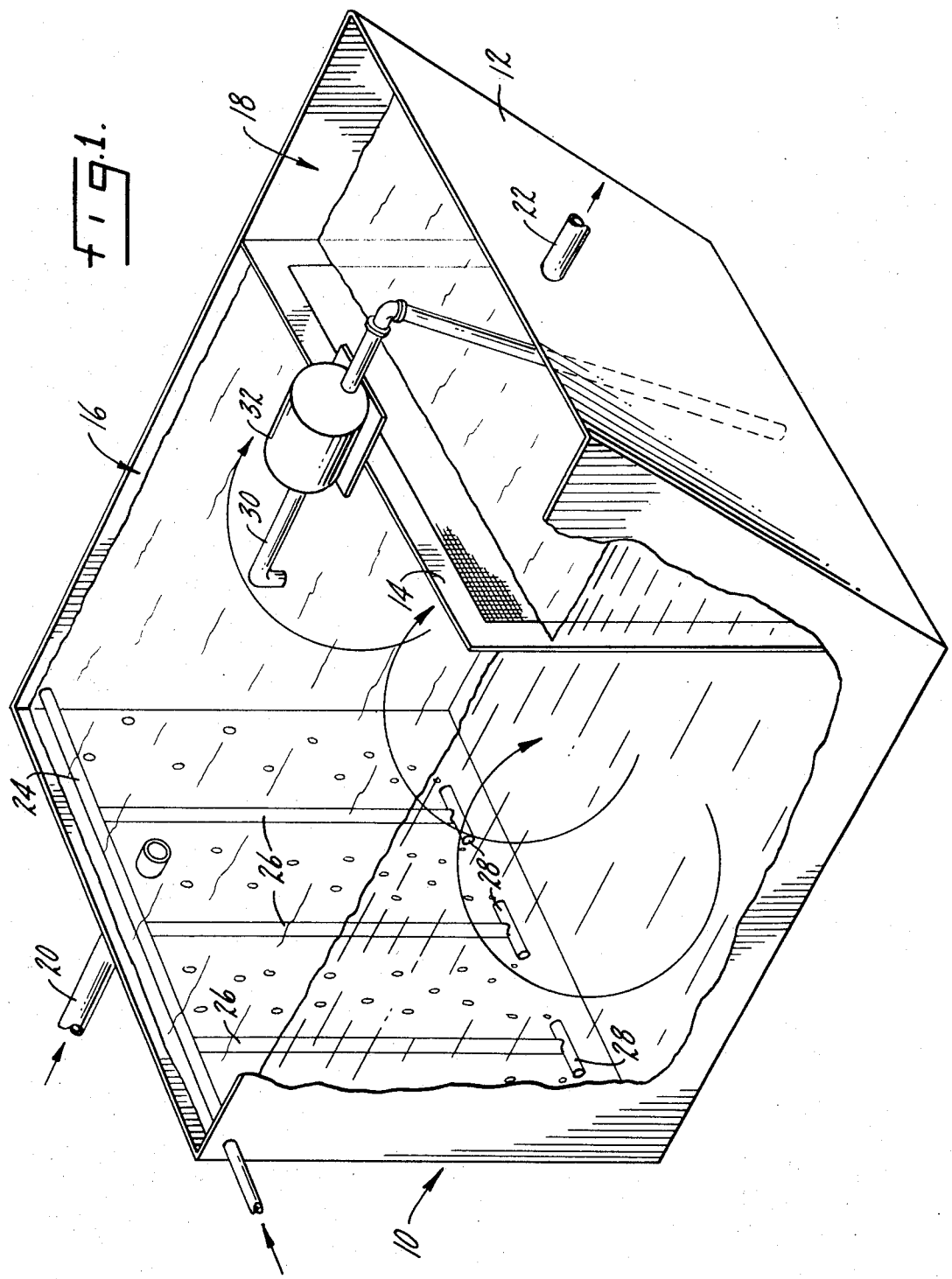

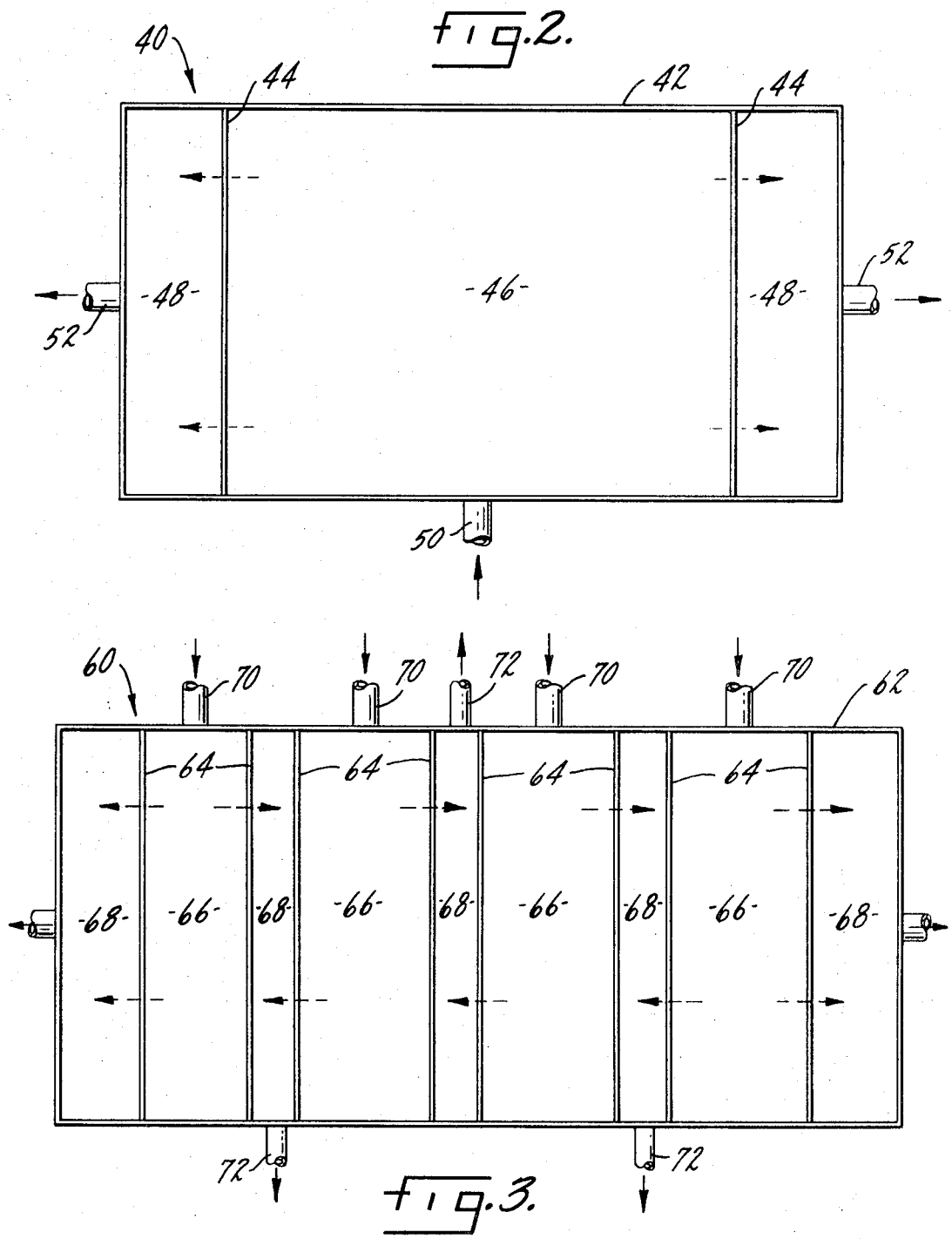

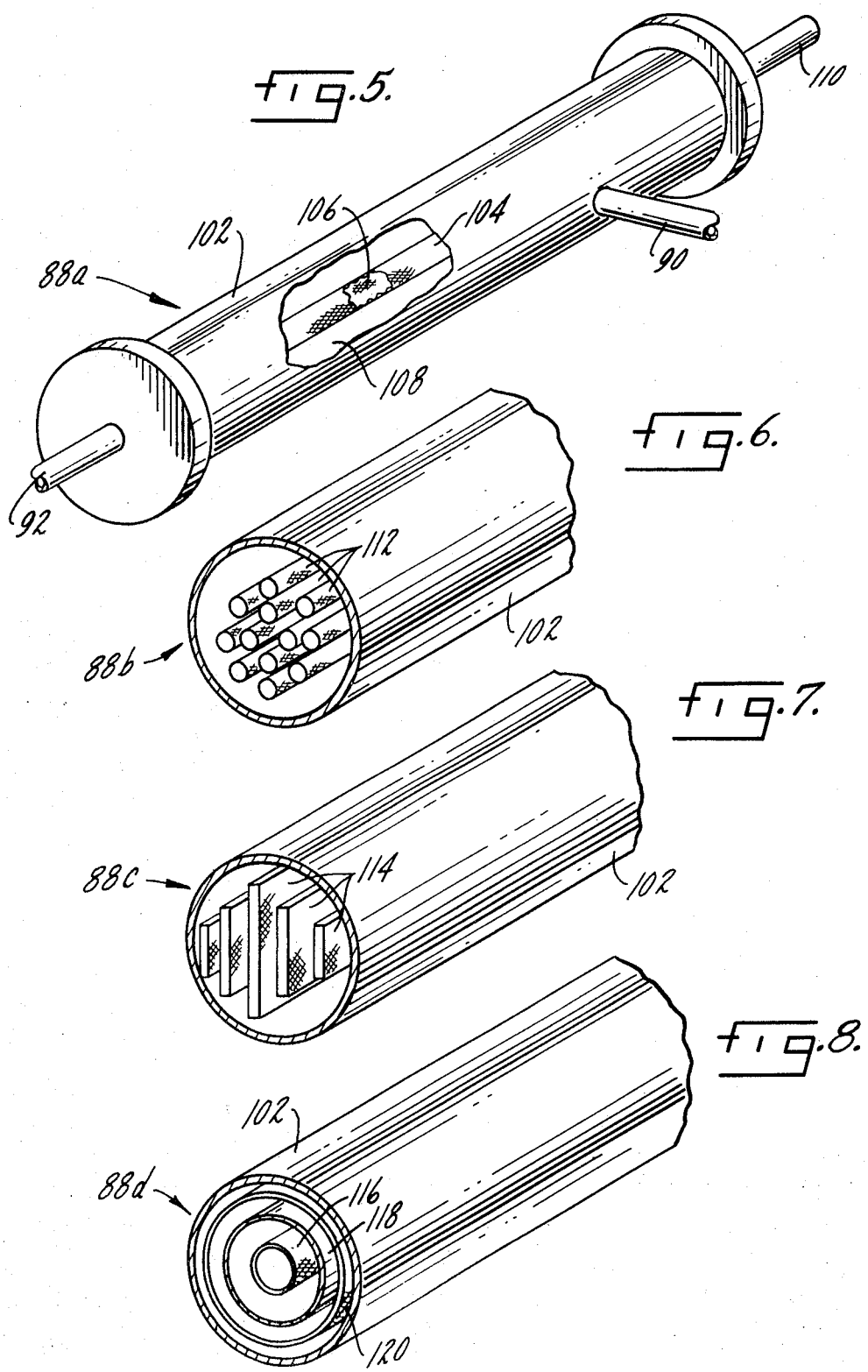

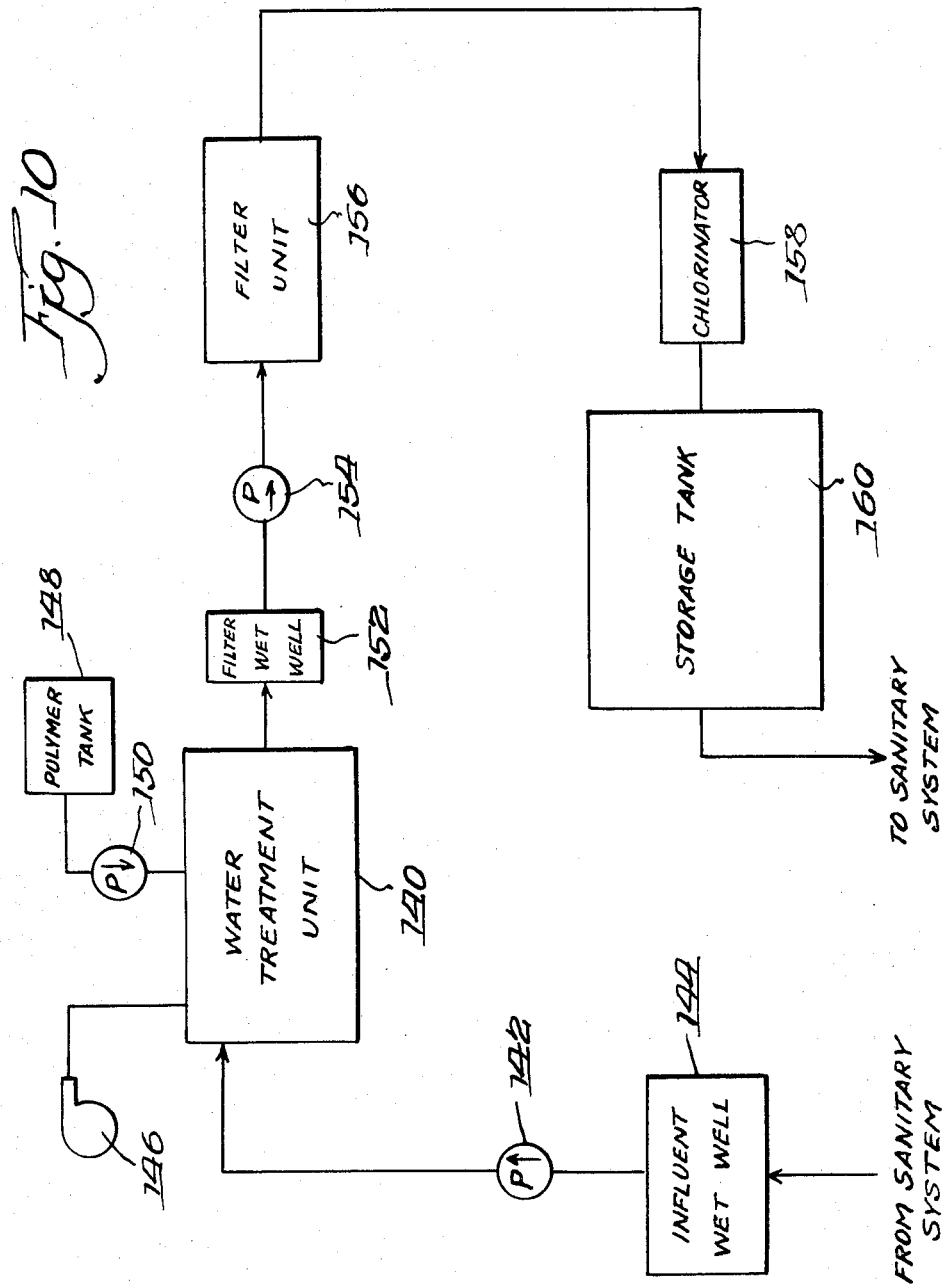

United States Patent Office 3,770,624
Patented Nov. 6, 1973

3,770,624
METHOD FOR TREATING WATER CONTAINING SUSPENDED SOLIDS FROM A SANITARY SYSTEM
James W. McKibben, Brian L. Goodman, and Robert B. Higgins, Overland Park, Kans., assignors to Ecodyne Corporation, Chicago, Ill.
Filed Dec. 14, 1970, Ser. No. 97,977
Int. Cl. C02c 1/12
U.S. Cl. 210—8
16 Claims

ABSTRACT OF THE DISCLOSURE

The invention provides an improved method and apparatus for treating water containing suspended solids from a sanitary system. In carrying out the method, the water is aerated and delivered to a screen with a directional component across the screen surface and a directional component through the screen. The screen has openings large enough to pass the majority of the solids suspended in the water, and has the ability to hold a coating of these solids on its upstream side. The flow of water is controlled so that a coating of the suspended solids from the water is formed on the screen surface. The delivery of water containing these suspended solids to the screen is continued with a directional component across the screen and a directional component through the screen, whereby to filter solids from the water passing through the coating and screen. The relationship between the directional components across and through the screen is controlled to maintain the coating on the screen. The water that is passed through the screen is stored, and is recycled to the sanitary system.

---

The present invention relates to an improved method and apparatus for treating water containing suspended solids from a sanitary system.

The pollution of waterways is a problem that has been the subject of increasing legislative attention and attack. This is particularly true of sanitary wastes from watercraft, which have heretofore sometimes been dumped into waterways with no treatment whatever. While a number of methods have heretofore been available for dealing with this pollution problem, each of these methods suffers from a number of disadvantages. Furthermore, many of the present methods for dealing with sanitary wastes on watercraft do not always meet local ordinances, which sometimes permit no discharge whatever into the waterway.

Perhaps the simplest method heretofore employed for dealing with sanitary wastes is the use of holding tanks. Such holding tanks may include either the use of a central tank into which waste flow is delivered or the use of individual tanks or plastic bags for each source of sanitary waste. The use of holding tanks has a number of advantages, including simplicity and adaptability to virtually all types and sizes of vessels. Furthermore, the use of holding tanks completely prevents the discharge of waste into the waterway, and thus meets even the most stringent legislative standards. However, such systems have significant disadvantages, including the requirement that the boat periodically visit shore installations for receiving waste products, the production of odors, and the requirement for a large amount of space for the tank.

Another method of waste disposal that has heretofore been employed aboard watercraft is the use of incinerators. These have the advantage of completely destroying the waste products, so that there is no discharge into the waterway. Furthermore, there is a significant reduction in the space required compared to the use of holding tanks. However, incinerators have a number of disadvantages, including the requirement for fuel or large amounts of electrical power, fire hazard, and generally limited applicability to human body waste only.

A third method that has been employed to handle wastes aboard watercraft is maceration and chlorination. As with incineration, only a small and light-weight unit is required. Such units are relatively easy to install and produce a minimum of objectional odors. However, such units may not meet certain local standards where overboard discharge is employed. There is no reduction in organic materials having a biological oxygen demand, nor is there a reduction in the quantity of solids and nutrients. Furthermore, it is highly questionable that such methods alone achieve satisfactory disinfection of sewage.

A fourth method that has heretofore been employed for handling sanitary wastes aboard watercraft is bioligical treatment. Biological treatment has the advantage that secondary treatment can be achieved, and all sewage aboard the watercraft (not just human waste) can be adequately treated. However, biological treatment has heretofore required large and heavy units, and the process has not been adapted to small vessels or to vessels with small crews, since trained operators are required.

It is the broad object of the present invention to provide a system for treating sanitary wastes, which is particularly adapted to use aboard watercraft, and which solves the foregoing problems. It is a further object to provide a method and apparatus for treating sanitary wastes which does not deliver any discharge to a waterway.

Generally, in carrying out the method of the present invention, water containing suspended solids from the sanitary system is aerated and delivered to a screen with a directional component along the screen surface and a directional component through the screen. This screen must be of the proper design, and must have openings large enough to pass the majority of the suspended solids, while also having the ability to hold a coating of these solids on the upstream side. The flow of the water containing the suspended solids is controlled so that a coating of the solids from the water is formed on the screen surface. The delivery of the water containing the suspended solids to the screen is continued with a directional component across the screen and the directional component through the screen, whereby to filter solids from the water passing through the coating and screen. The relationship between the directional components across and through the screen is maintained in order to maintain the coating on the screen, while continuing delivery of liquid through the screen. The water is stored after it is passed through the screen, and is subsequently recycled to the sanitary system.

The apparatus generally comprises means defining a filtration zone, and a screen dividing the filtration zone into influent and effluent zones. The screen has openings large enough to pass the majority of the suspended solids contained in the liquid from the sanitary system, and has the ability to hold a coating of the solids on the upstream side. Aeration means are provided in the influent zone, and means are provided for delivering water containing suspended solids from a sanitary system to the influent zone. The apparatus also comprises means for delivering water and suspended solids to the screen with a directional component across the screen and a directional component through the screen. The apparatus also has storage means for storing water downstream of the screen, together with means for delivering water from the effluent zone to the storage means. Finally, recycle means are provided for recycling water back to the sanitary system.

The invention, its construction and method of operation, together with further objects and advantages thereof, will be best understood by reference to the following detailed description, taken together with the drawings, in which:

FIG. 1 is a perspective view of a water treatment unit for use in conjunction with the present invention, partially cut away to show the interior details thereof;

FIG. 2 is a simplified plan view of another water treatment unit that may be employed in accordance with the present invention;

FIG. 3 is a simplified plan view of still another water treatment unit that may be employed in conjunction with the present invention:

FIG. 5 is a perspective view of a screen tube-type water treatment unit, partially cut away to show the interior details thereof;

FIG. 6 is a sectional perspective view of another screen tube unit that may be employed in conjunction with the present invention;

FIG. 7 is a sectional perspective view of another screen tube unit that may be employed in conjunction with the present invention;

FIG. 8 is a sectional perspective of still another screen tube unit that may be employed in conjunction with the present invention;

FIG. 10 is a flow chart of an apparatus for treating water containing suspended solids from a sanitary system, embodying the features of the present invention.

Figure 4:
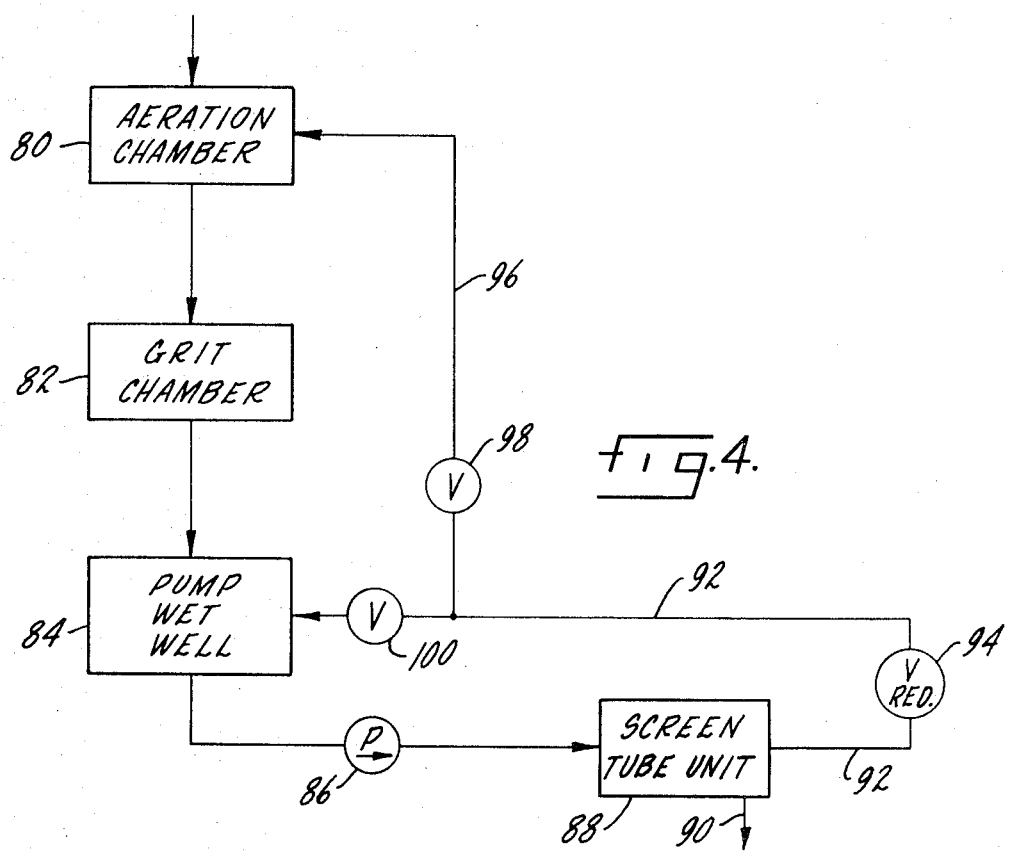
FIG. 4 is a flow chart illustrating the construction and operation of a system for use with a screen tube type of water treatment unit.

It has been surprisingly discovered that suspended solids, particularly human wastes, that are to be filtered through a liquid can be employed to form a thin coating on the surface of a screen through which a majority of these solids would normally be expected to pass, simply by properly selecting the screen material for the suspension being filtered, by controlling the size of the openings of the screen within the proper range, and by delivering the liquid containing solids to the screen with a directional component parallel to the screen and a directional component through the screen. In this manner, the solids that are to be filtered from the liquid themselves form a filtration medium. An important advantage of this method is that the filter is, in effect, self-cleaning, and shutdowns of the apparatus for filter cleaning are not necessary.

The screen should be made of a material that is capable of holding a coating of the suspended solids that are to be removed from the water. While a wide variety of screen materials may be employed, including natural and synthetic substances, the preferred materials for the screen are corrosion-resistant metals and synthetic organic polymers. Corrosion resistant metals must also show no interference with the treatment of water by the activated sludge process. Suitable corrosion resistant metals include aluminum and nickel, as well as such well known alloys as Monel (registered trademark of the International Nickel Company), an alloy of nickel and copper; and nickel-chromium alloys such as Nichrome, Cambroloy, and Inconel (a trademark of the International Nickel Company). Inconel contains 15.5% chromium, 75% nickel, the balance being iron. Stainless steels may also be employed. Particularly preferred are types 302, 304, 305, and 316 stainless steels, although other stainless steels may also be suitably employed. Examples of suitable synthetic organic polymers include polyethylene, polypropylene, nylon, and Dacron, the preferred polymers being polyethylene and Dacron. Dacron is a trademark for a synthetic polyester fiber made from methyl terephthalate and ethylene glycol, and marketed by E. I. du Pont de Nemours & Company. In most applications, the metal screens are preferred because of their superior mechanical strength.

The size of the openings in the screen should also be controlled within the proper range. If the openings are too small, the flow of water through the screen will be significantly hampered, and the screen will tend to become clogged. Thus, it is important that the openings be at least large enough to pass the majority of the suspended solids that are to be filtered from the liquid. On the other hand, it is important that the openings of the screen not be too large, since openings that are too large will hamper the ability of the screen to hold the solids coating. Of course, the screen openings must be adjusted to the particular process conditions encountered, including the volume of solids that can be tolerated in the effluent stream, and the particle size and nature of the suspended solids. As a general matter, the openings should be in the range of about 10 to 100 microns. In the preferred embodiment, for most sanitary waste removal applications, a screen opening size in the range of about 50 to 90 microns is preferred.

The weave pattern of the screen is not critical. Suitable patterns that may be employed in the present invention include plain square, twilled square, plain Dutch, twilled Dutch, basket weave, etc. In the case of a plain square weave, the size of the openings is easily calculated once the gauge (thickness) of the strands and the number of strands per centimeter are known. In this instance, the opening size is expressed in terms of the length of the square opening along one side. For more complex weave patterns the size of the openings may be determined in accordance with the bubble test method set forth in S.A.E. Standard ARP-901 (April 1968).

The directional components of the liquid containing the suspended solids parallel to the filter and through the filter must also be properly controlled in order to maintain the correct coating layer. Again, these variables must be adjusted to each individual situation, so that it is difficult to generalize upon the optimum figures. However, it may generally be said that the directional component across the screen and coating layer should not be greater than about 10 feet per second, and preferably should not be greater than about 5 feet per second. In the case of most sanitary wastes, the directional component across the screen should be in the range of about 1 to 3 feet per second.

The directional component through the screen and coating should, as a general matter, vary in the range of about 4 to 300 gallons per day per square foot of screen surface area. Preferably, in the case of sanitary wastes, the directional component through the filter should be in the range of about 5 to 50 gallons per day per square foot of screen surface area.

Referring to the drawings, FIG. 1 shows a simple form of a water treatment unit, generally indicated by reference numeral 10, which may be employed in the water treating method and apparatus of the present invention. The waste treatment apparatus 10 in this instance is designed to remove biodegradable impurities by an activated sludge process, followed by filtration. The waste treatment apparatus 10 comprises a tank 12, which is separated by a screen 14 into an influent compartment or zone 16 and an effluent compartment or zone 18. An inlet pipe 20 communicates with an upper portion of the influent zone 16, while an outlet pipe 22 communicates with an upper portion of the effluent zone 18. Unless the influent zone 16 is enclosed and pressurized, the outlet pipe 22 should be positioned below the level of the inlet pipe 20 in order to build up a head differential across the screen 14 to allow liquid to flow from the influent zone 16 to the effluent zone 18.

In the water treatment unit shown, the influent zone 16 also forms an aeration chamber, and accordingly has suitable aeration means, in this instance defined by a cross pipe 24 and three down pipes 26, which are connected to horizontal air outlet pipes 28 at the bottom. Air is introduced into the water and suspended solids in the influent zone 16, producing a tumbling motion in the water as indicated by the arrows, so that there is a velocity component in the water parallel to the surface of the screen 14. At the same time, a directional component through the screen 14 is produced by the difference in heads between the input zone 16 and the effluent zone 18. It is preferred to locate the air outlet pipes 28 far enough from the screen 14 to avoid air scrubbing of the screen, which could cause partial removal of the coating layer.

A small amount of solids will ordinarily pass through the screen 14 into the effluent zone 18. Accordingly, in the embodiment shown, the tank 12 is shaped so that the effluent zone 18 is narrower at the bottom than at the top in order to concentrate these solids. The solids are periodically returned to the influent zone 16 through a solids return pipe 30 having a pump 32, providing communication between the bottom of the effluent zone 18 and the influent zone 16.

FIG. 2 shows a second apparatus constructed in accordance with the present invention, generally indicated by reference numeral 40. The apparatus 40 has a tank 42 which has four screens 44, forming an inner, rectangular influent zone 46 and an outer effluent zone 48 around the perimeter of the tank. Water containing suspended solids is delivered to the influent zone 46 through an inlet pipe 50, and is removed from the effluent zones 48 through an outlet pipe 52. As with the embodiment shown in FIG. 1, the embodiment of FIG. 2 has an air input system (not shown), which may be of conventional design such as that shown in FIG. 1. The air input system should be designed to produce a tumbling motion in the water in order to produce a directional component parallel to the surface of the screens 44. As with the embodiment shown in FIG. 1, movement of water through the screens, as shown by the arrows, is produced by the difference in pressure head between the influent zone 46 and the effluent zone 48.

FIG. 3 shows yet another embodiment of the present invention, wherein there are a plurality of screens, influent zones, and effluent zones. This second modified apparatus is indicated generally by reference numeral 60. As shown in the drawing, the apparatus 60 comprises a tank 62 having a plurality of vertical screens 64 separating the tank into a plurality of influent zones 66 and effluent zones 68. Each influent zone 66 has an inlet pipe 70 communicating therewith, while each effluent zone has an outlet pipe 72. As with the embodiments shown in FIGS. 1 and 2, the second modified apparatus 60 has means (not shown) for aerating the liquid and suspended solids in the influent zones 66, a well as means to produce a suitable directional component parallel to the screen's surface.

The operation of the water treatment units shown in FIGS. 1-3 is basically the same. The influent zone of the various apparatus will contain activated sludge, while solid material will be filtered out in passing the liquid from the influent zone to the effluent zone. The operation of the unit is controlled by controlling the velocity of the liquid parallel to the screen and through the screen. As previously mentioned, the velocity parallel to the screen is a function of the speed at which the liquid is caused to tumble by the air injection, and this variable is therefore controlled by controlling the speed at which air is injected. The movement of water through the screen is controlled by the difference in pressure heads between the influent zone and the effluent zone. Total aeration time in the influent zone should be about 2 to 48 hours, and preferably about 12-24 hours, to permit the activated sludge to properly degrade the biodegradable, as is well known in the art.

The apparatus shown in FIGS. 1-3 may be modified to pressurize the influent zone simply by covering the influent zone and providing an outlet valve for the air. The pressure within the influent zone could therefore be regulated by regulating the air pressure.

The second general embodiment of the water treatment unit uses a tubular screen, referred to herein as a "screen tube," instead of the planar screen shown in FIGS. 1-3. The screen tube separates the means that define the liquid filtration zone into an influent zone and an effluent zone. The influent zone may be defined by the interior of the tube, in which case the effluent zone would be defined by the area surrounding the tube. However, this arrangement may be reversed, so that the area surrounding the tube constitutes the influent zone, while the interior of the tube forms the effluent zone. In any event, it is essential that water containing suspended solids be delivered to the screen tube under pressure so that there will be a directional component through the tube, while the liquid and suspended solids also flow parallel to the surface of the tube. Ordinarily, this pressure will be provided by a pump.

FIG. 4 shows a suitable flow diagram for use in connection with the screen tube-type of embodiment shown in FIGS. 5-9. The water containing suspended wastes is delivered first to a conventional aeration chamber 80, where the liquid and suspended solids are aerated, preferably for the times previously set forth. The water and suspended solids are then transferred to a grit chamber 82, where readily settleable materials are removed. From that point, the water and suspended solids are delivered to a pump wet well 84 and then to a pump 86. The pump wet well 84 contains a sufficient amount of liquid to keep the pump 86 primed, so that an even flow to the screen tube unit is maintained. The water and suspended solids are delivered by the pump 86 to the influent zone defined by a screen tube unit 88. Various embodiments for such a screen tube unit 88 are shown in FIGS. 5-8, hereinafter discussed. A coating of solids is formed within the screen tube unit 88, and water is filtered through this coating, passing to the effluent zone defined by the screen tube unit 88 to a filtered water outlet pipe 90, which delivers water to the rest of the system, as described in detail hereinafter. The remainder of the water, which will be concentrated in its solids content, passes out of the influent zone through a concentrate outlet pipe 92. The concentrate outlet pipe 92 has a pressure reduction valve 94 to maintain the proper pressure within the influent zone of the screen tube unit 88. The liquid, which has been concentrated in its suspended solids content, will ordinarily be returned to the aeration chamber 80 through a recycle pipe 96 having a recycle valve 98. However, the water and suspended solids can optionally be returned to the pump wet well 84 by closing the recycle valve 98 and opening a pump wet well return valve 100 on the concentrate outlet pipe 92, which communicates back with the pump wet well 84. The recycle of water containing suspended solids through the pump wet well 84 may be desirable, for example, when building up a coating on the screen tube 88. Furthermore, if, for some reason, it is desired to shut down flow from the aeration chamber, flow should be maintained through the screen tube unit 88 by recycling through the pump wet well 84. Since the method of the present invention depends upon the maintenance of the proper dynamic conditions in order to maintain a proper coating layer, it is important that flow through the screen tube unit 88 not be interrupted.

FIGS. 5-8 show suitable screen tube units 88a-88d for use in accordance with the present invention. Referring to FIG. 5, the screen tlbe unit 88a comprises an outer encasing tube 102 and an internal screen tube 104. The screen tube 104 separates the unit into an influent zone 106, defined by the interior of the screen tube 104, and an effluent zone 108 defined by the encasing tube 102 and the outside wall of the screen tube 104. Liquid containing suspended solids is delivered to the influent zone 106 through an inlet pipe 110 communicating with the interior of the screen tube 104. A coating is formed on the interior of the screen tube 104, and suspended solids are filtered from the liquid as it passes through the screen tube 104 into the effluent zone 108, and eventually to the filtered liquid outlet pipe 90, corresponding to the filtered liquid outlet pipe 90 shown in FIG. 4. The liquid that has not passed to the effluent zone 108 will be concentrated in solids, and will pass through the concentrate outlet pipe 92.

FIGS. 6–8 show modifications of the apparatus shown in FIG. 5. In FIG. 6, the encasing tube 102 has a plurality of screen tubes 112. This design will give a much larger screen surface area than would be given by a single screen tube 104 as shown in FIG. 5.

In the embodiment of FIG. 7, a plurality of screen tubes 114 having a rectangular cross-sectional configuration is employed.

Finally, in FIG. 8, a plurality of concentric tubes is employed. This embodiment has a central screen tube 116 surrounded by a cylinder 118, which does not permit the passage of liquids. The cylinder 118 is surrounded by an outer screen tube 120, which, in turn, is surrounded by the encasing tube 102. Thus, the influent zone is formed by the interior of the central screen tube 116. A second influent zone is formed by the cylinder 118 and the outer screen tube 120. Effluent zones are formed between the central screen tube 116 and the cylinder 118, and also between the outer screen tube 120 and the encasing tube 102.

The operation of the screen tube units shown in FIGS. 5–8 is similar in principle to the operation of the water treatment apparatus shown in FIGS. 1–3. The directional component of the liquid and suspended solids parallel to the screen is controlled by the flow rate at which the liquid is pased through the screen tube, and the directional component through the screen is controlled by pressure. These components should be controlled within the limits previously mentioned.

It should be borne in mind that the embodiments shown in FIGS. 5–8 may be modified to reverse the direction of liquid flow. That is, in the embodiment shown in FIG. 5, for example, liquid containing suspended solids could be delivered to the area between the screen tube 104 and the encasing tube 102, so that the influent and effluent zones can be reversed.

Figure 9:
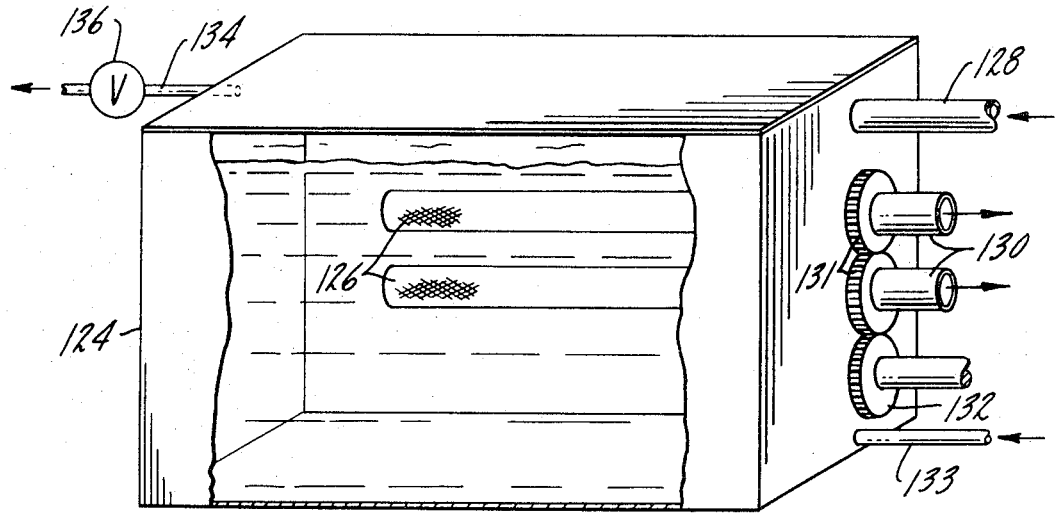
FIG. 9 is a perspective view of another embodiment of a screen tube unit that may be employed in conjunction with the present invention, partially cut away to show the interior details thereof.

FIG. 9 shows yet another type of apparatus that may be constructed in accordance with the present invention. This embodiment employs a closed tank 124 having a pair of rotatable screen tubes 126 projecting into the interior thereof. Liquid containing suspended solids is delivered to the tank 124 through an inlet pipe 128, and a coating is formed on the screen tubes 126. Filtered liquid passes out of the tank through outlet pipes 130 communicating with the interior of the screen tubes 126. A velocity component parallel to the surface of the screen tubes 126 is obtained by rotating the screen tubes 126 within the liquid. To this end, each screen tube 126 is mounted for rotation, and has an external gear 131. These external gears 131 are driven by a drive gear 132, which, in turn, is connected to suitable drive means (not shown).

If it is desired to aerate the liquid and suspended solids, suitable aeration means may be employed, such as an air inlet pipe 133, communicating with suitable air distributors (not shown) inside the tank 124.

The tank 124 shown in FIG. 9 is preferably fully enclosed, and has an air outlet pipe 134 having a pressure control valve 136 for controlling pressure within the tank 124. The pressure within the tank 124, in turn, controls the rate of flow of liquid through the screen tubes 126.

The preferred use for the water treatment unit employed in the present invention is in connection with waste removal processes that use activated sludge. The mixed liquor containing the activated sludge forms an excellent coating on the screen, effectively preventing significant amounts of suspended solids from being transferred to the effluent zone. While this coating is found primarily on the upstream side, examination of the screen shows the growth of bacterial colonies within the interstices of the screen network, and even some growth on the downstream side.

FIG. 10 illustrates an apparatus for treating water containing suspended solids from a sanitary system, constructed in accordance with the present invention. In FIG. 10, the water treatment unit, as heretofore described, is indicated by reference numeral 140. Water from the sanitary system is delivered to the water treatment unit 140 by a pump 142. The pump 142 draws water from an influent wet well 144. In most systems, it is only necessary to operate the pump 142 when the wet well 144 becomes full, and the pump 142 may be actuated by a level sensing device, such as a float (not shown) in the influent wet well 144.

In the water treatment unit 140, as described above, the water containing suspended wastes is aerated by air delivered from a blower 146. In the most preferred embodiment of the present invention, a polymeric coagulant is delivered to the water before the water is delivered to the screen. This polymeric coagulant is stored in a polymer tank 148, and is delivered to the influent zone of the water treatment unit 140 by a pump 150.

Suitable polymeric coagulants which may be employed are exceedingly well known in the art. Such coagulants are sold commercially by the Calgon Corporation, Pittsburgh, Pa., under the trade names Calgon WT–2660 and WT–2870. These materials are described as viscous liquid, cationic polyelectrolytes. Suitable cationic polymers are also sold by Reichold Chemicals, Inc., White Plains, N.Y., under the trademark "Aqua-Rid." These are described as "water-miscible liquid cationic polyamine polyelectrolytes." Additional cationic polymers that may be employed are sold under the trade names Hercofloc 810, 814, and 828.1 by Hercules, Inc., Wilmington, Del. Finally, suitable cationic polymers are also marketed by Rohm & Haas Co. under the trade name Rohm & Haas C–7.

Influent flow from the water treatment unit 140 is delivered to a filter wet well 152, and then via a pump 154 to a filter unit 156. The filter wet well 152 operates in the same manner as the influent wet well 144. That is, when the wet well 152 becomes full, a level sensing device actuates the pump 154, which empties the filter wet well 152 by pumping its contents to the filter unit 156.

The filter unit 156 filters additional solids from the water which have passed through the screen in the water treatment unit 140. Any well known filter medium may be employed, and it is preferred that such filter medium be adequate to remove any visible particles from the water, i.e., particles having a diameter greater than about 0.5 micron. A particularly suitable filter unit is made up of three stages of paper filter elements having successively decreasing pore sizes of 5 microns, 3 microns, and 0.5 micron. Suitable paper filters are sold by the Hilliard Corporation, Elmira, N.Y., under the trade name "Hilco."

After being passed through the filter unit, the water will be optically clear. The water is next delivered to a chlorinator 158 of conventional design. The chlorinator 158 delivers chlorine to the water in order to destroy any harmful bacteria. Preferably, this chlorine should be delivered in an amount sufficient to produce a "chlorine residual" of about 1–2 milligrams per liter. The definition of the term "chlorine residual" is well known to those skilled in the art, and is discussed in Sawyer & McCarty, Chemistry for Sanitary Engineers, McGraw-Hill Book Company (2d ed.), chapter 21. Water is delivered from the chlorinator 158 to a storage tank 160, which stores sufficient treated water to insure a supply for the sanitary system during periods of peak demand. Water is delivered from the storage tank 160 back to the sanitary system for use, as shown in FIG. 10.

The following example is intended to illustrate the present invention, and should not be construed as limitative, the scope of the invention being determined by the appended claims.

EXAMPLE

A water treatment system similar to that shown in FIG. 10 was constructed on board a ship. The water treatment unit was constructed in accordance with FIG. 2. The water treatment unit 140 had a volume of 1,530 gallons during normal operation, and had a capacity for an additional 417 gallons during periods of high throughput. The minimum volume for proper aeration was 983 gallons. The unit was designed for a normal through put of 1000 gallons a day, with an aeration time in the influent zone of about 12 to 48 hours. The screens employed in the water treatment unit were made of type 316 stainless steel, had a plain square weave, and had openings of about 70 microns. The influent zone contained a mixed liquor which was primarily a fresh water suspension of activated sludge. Total mixed liquor suspended solids were in the range of about 2000 to 6000 mg./l. Flow rate through the screen was maintained at about 5–30 gal./square foot/day. Air was injected into the influent zone at a rate sufficient to produce a directional component of the liquid across the screen of about 2 to 2.5 feet per second.

Human waste products in suspension from the existing sanitary system on board ship were delivered to the influent wet well indicated in FIG. 10 by reference numeral 144. This influent wet well had a maximum volume of 295 gallons and had a float-type level sensor for actuating the influent pump 142 whenever the wet well 144 was full. The actuation of the pump 142 delivered water and suspended waste matter to the water treatment unit 140, which operated by the activated sludge process as previously described. Air was delivered to the influent zone of the water treatment unit 140 by a blower 146 having a capacity of 8 cubic feet per minute at 10 p.s.i. The polymer tank 148 had a capacity of 350 gallons and the feed pump 150 had a variable capacity of 0 to 60 gallons per day. The pump 142 had a capacity of 20 gallons per minute, and was connected to the influent wet well 144 in a manner such that it shut off automatically whenever the influent wet well was emptied.

Treated water from the water treatment unit 140 as delivered to the filter wet well 152, which had a float-type level sensor, similar to that in the influent wet well 144. The filter wet well 152 had a maximum volume of 350 gallons, and a minimum volume of 95 gallons. When the float level sensor indicated that the filter wet well 152 was full, it actuated a pump 154 to pump the water from the filter wet well 152 to a filter unit 156. The pump was shut off when the filter wet well reached its minimum volume of 95 gallons.

The filter unit was made up of an assembly of three Hilco paper cartridge filters arranged in series. These filters had a successively decreasing pore diameter of 5 microns, 3 microns, and 0.5 micron. Such a use of successive filters retards clogging of the filters with the smaller pore openings. After passing through the filter unit 156, the water was delivered to a commercially available chlorinator. In this instance, the chlorinator used commercially available chlorination tablets, marketed under the trade name "Sanuril" by the Diamond Shamrock Corporation. Sufficient chlorine was added to the water to provide a chlorine residual of 1 to 2 milligrams per liter.

Finally, the water was delivered to a storage tank having a capacity of about 3000 gallons. From the storage tank, the water was delivered through a throttling pump to the existing sanitary system. The water as delivered to the storage tank was "optically clear," i.e., had the appearance of pure water.

Obviously, many modifications and variations of the invention as hereinbefore set forth will occur to those skilled in the art, and it is intended to cover in the appended claims all such modifications and variations as fall within the true spirit and scope of the invention.

We claim:

1. A method for treating water containing suspended solids from a sanitary system comprising: aerating said water, delivering said water to a screen with a directional component across the screen surface and a directional component through said screen, said screen having openings large enough to pass the majority of said suspended solids, and said screen having the ability to hold a coating of said solids on the upstream side thereof; controlling the flow of said water containing said suspended solids so that a coating of said suspended solids is formed on said screen surface; continuing the delivery of said water containing suspended solids to said screen with a directional component across said screen and a directional component through said screen, whereby to filter solids from said water passing through said coating and screen; controlling the relationship between said directional components to maintain said coating on said screen, while continuing the delivery of water through said screen; storing said water after it has passed through said screen; and recycling said water to said sanitary system.

2. The method as defined in claim 1 further comprising the step of filtering said water after said water has been passed through said screen, said filtering being performed with a filter medium that prohibits the passage of particles having a diameter larger than 0.5 micron.

3. The method as defined in claim 1 further comprising the step of introducing a polymeric coagulant into said water prior to delivering said water to said screen.

4. The method as defined in claim 1 further comprising the step of chlorinating said water after said water has been passed through said screen.

5. The method as defined in claim 2 further comprising the step of chlorinating said water after said water has been passed through said screen.

6. The method as defined in claim 5 further comprising the step of introducing a polymeric coagulant into said water prior to delivering said water to said screen.

7. The method as defined in claim 1 wherein said directional component across said screen is no greater than about five feet per second.

8. The method as defined in claim 1 wherein said directional component across said screen is about 1 to 3 feet per second.

9. The method as defined in claim 1 wherein said directional component across said screen is no greater than 10 feet per second.

10. The method as defined in claim 9 wherein said directional component through said screen is about 4 to 300 gallons per square foot per day.

11. The method as defined in claim 9 wherein said directional component through said screen is about 5 to 50 gallons per square foot per day.

12. The method as defined in claim 11 wherein said directional component across said screen is about 1 to 3 feet per second.

13. A method for treating water containing suspended solids from a sanitary system comprising: aerating said water; delivering said water through a screen having openings large enough to pass a majority of said suspended solids, said openings being in the range from about 10 to 100 microns with a directional component across said screen and a directional component through said screen, said directional component across said screen being no greater than about 10 feet per second, and said directional component through said screen being about 4 to 300 gallons per square foot per day, whereby to form a coating of said solids on said screen surface; continuing the delivery of said water to said screen with said directional components across and through said screen, whereby to filter solids from said water passing through said coating and screen; controlling the relationship between said directional components to maintain said coating on said screen; storing said water after it has passed through said screen; and recycling said water to said sanitary system.

14. The method as defined in claim 13 further comprising the step of filtering said water after said water has been passed through said screen, said filtering being performed with a filter medium that prohibits the passage of particles having a diameter larger than 0.5 micron.

15. The method as defined in claim 14 further comprising the step of chlorinating said water after said water has passed through said screen.

16. The method as defined in claim 15 further comprising the step of introducing a polymeric coagulant into said water prior to delivering said water to said screen.

References Cited

UNITED STATES PATENTS

| | | | |
|---|---|---|---|
| 3,575,850 | 4/1971 | Davidson et al. | 210—15 |
| 3,425,936 | 2/1969 | Culp et al. | 210—8 |
| 2,798,228 | 7/1957 | Boester | 210—60 X |
| 3,331,771 | 7/1967 | Watson et al. | 210—18 X |
| 3,398,088 | 8/1968 | Okey | 210—7 X |
| 2,407,303 | 9/1946 | Teale | 210—433 X |

MICHAEL ROGERS, Primary Examiner

U.S. Cl. X.R.

210—14, 18, 73, 196, 221